(12) United States Patent
Wadeyar et al.

(10) Patent No.: US 11,955,879 B2
(45) Date of Patent: Apr. 9, 2024

(54) ARCHITECTURE TO MITIGATE OVERSHOOT/UNDERSHOOT IN A VOLTAGE REGULATOR

(71) Applicant: Texas Instruments Incorporated, Dallas, TX (US)

(72) Inventors: Venkatesh Wadeyar, Bangalore (IN); Vikas Lakhanpal, Bangalore (IN); Preetam Charan Anand Tadeparthy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 137 days.

(21) Appl. No.: 17/137,446

(22) Filed: Dec. 30, 2020

(65) Prior Publication Data
US 2022/0209648 A1 Jun. 30, 2022

(51) Int. Cl.
*G06F 1/28* (2006.01)
*H02M 1/32* (2007.01)

(52) U.S. Cl.
CPC ............. *H02M 1/32* (2013.01); *G06F 1/28* (2013.01)

(58) Field of Classification Search
CPC ............. G06F 1/26; G06F 1/28; H02M 1/32
See application file for complete search history.

(56) References Cited

U.S. PATENT DOCUMENTS

| | | | |
|---|---|---|---|
| 9,614,506 B1* | 4/2017 | DiRenzo | H03K 5/12 |
| 2005/0146312 A1* | 7/2005 | Kenny | H02M 3/157 |
| | | | 323/283 |
| 2007/0124612 A1* | 5/2007 | Chapuis | G06F 1/329 |
| | | | 713/300 |
| 2013/0086396 A1* | 4/2013 | Liu | G06F 1/266 |
| | | | 713/300 |
| 2013/0154592 A1* | 6/2013 | Teh | G05F 1/56 |
| | | | 323/273 |
| 2016/0070335 A1* | 3/2016 | Mitrea | G06F 1/3243 |
| | | | 713/323 |
| 2018/0088647 A1* | 3/2018 | Suryanarayanan | |
| | | | G06F 13/4282 |
| 2018/0337585 A1* | 11/2018 | Xu | H02M 3/04 |
| 2019/0294227 A1* | 9/2019 | Luo | G05F 1/465 |

FOREIGN PATENT DOCUMENTS

CN 105978315 A * 9/2016 ............. H02M 1/36

* cited by examiner

*Primary Examiner* — Harry R Behm
(74) *Attorney, Agent, or Firm* — Valerie M. Davis; Frank D. Cimino

(57) ABSTRACT

In described examples, a controller includes a converter. The converter generates a first signal responsive to an input signal. A summing block is coupled to the converter. The summing block receives the first signal and generates a second signal. A limiter is coupled to the summing block and generates a third signal responsive to the second signal and a code signal. A logic block generates a target signal responsive to the third signal. The third signal transitions to an intermediate level at a first slew rate and the third signal transitions from the intermediate level to the target signal at a second slew rate.

19 Claims, 4 Drawing Sheets

ARCHITECTURE TO MITIGATE OVERSHOOT/UNDERSHOOT IN A VOLTAGE REGULATOR

TECHNICAL FIELD

This description relates generally to voltage regulators, and more particularly to an architecture to mitigate overshoot and undershoot in a voltage regulator.

BACKGROUND

A power management system finds application in multiple applications such as server, storage, communication, automotive, personal computer and gaming. In the power management system, a processing unit communicates with a voltage regulator. Based on its power needs, the processing unit dynamically controls multiple parameters of the voltage regulator, such as output voltage, slew rates and power states. Also, the processing unit monitors the voltage regulator for critical events, faults and telemetry information.

The processing unit requests a voltage regulator to generate a new voltage based on its transient requirements. The voltage regulator will transition from a current voltage to the new voltage. The voltage regulator, in some cases, can also transition to the new voltage based on its internal requirements. When the new voltage is higher than the current voltage, an overshoot occurs during this voltage transition. When the new voltage is lower than the current voltage, an undershoot occurs during this transition. The overshoot and undershoot result in settling delays in the voltage regulator. In some cases, the voltage regulator does not settle to the new voltage because of offsets associated with system components.

The voltage regulator is generally designed for a single industry protocol which includes SVID (Serial Voltage Identification), SVI (Serial Voltage Identification Interface) and AVS (Adaptive Voltage Scaling). This severely limits the usage of the voltage regulator. The voltage regulator is not adaptable to any changes in the specification of the industry protocol. For example, if in the specification of an industry protocol, changes are made to commands, slew rates, registers or new voltage levels are added, the voltage regulator would not respond to such modifications. Thus, the voltage regulator provides no support to multiple standard protocols and hence cannot be engaged in multiple application segments.

SUMMARY

In described examples, a controller includes a converter. The converter generates a first signal responsive to an input signal. A summing block is coupled to the converter. The summing block receives the first signal and generates a second signal. A limiter is coupled to the summing block and generates a third signal responsive to the second signal and a code signal. A logic block generates a target signal responsive to the third signal. The third signal transitions to an intermediate level at a first slew rate and the third signal transitions from the intermediate level to the target signal at a second slew rate.

DETAILED DESCRIPTION OF EXAMPLE EMBODIMENTS

Figure 1:
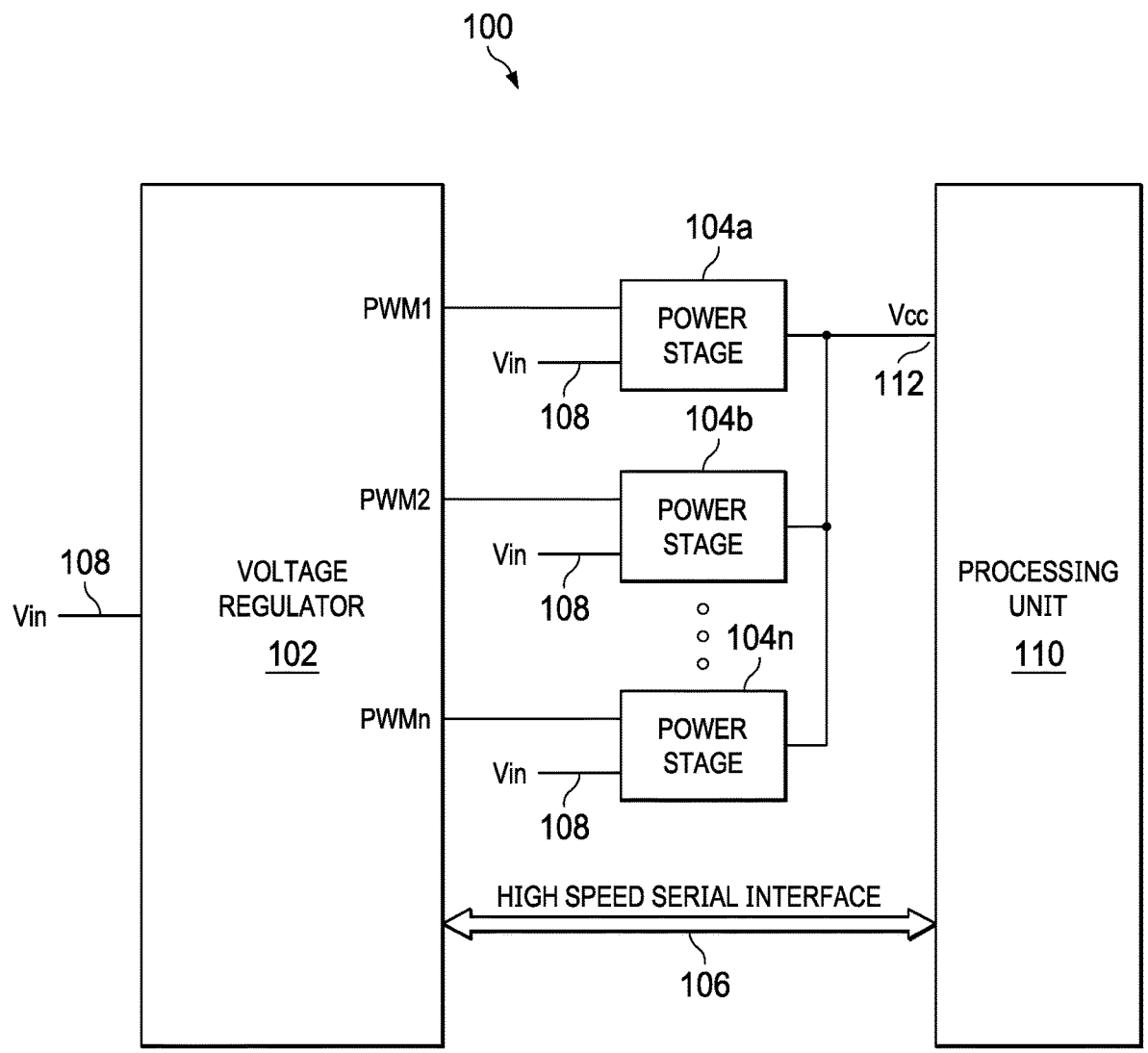
FIG. 1 is a block diagram of an example system in which several aspects of example embodiments can be implemented.

FIG. 1 is a block diagram of an example system 100 in which several aspects of example embodiments can be implemented. The system 100 includes a voltage regulator 102, a processing unit 110, a high speed serial interface (HSSI) 106 and multiple power stages illustrated as 104a, 104b to 104n. In one example, the power stages 104a to 104n are inside the voltage regulator 102. The voltage regulator 102 receives an input voltage Vin 108 and generates multiple PWM (pulsed width modulated) signals represented as PWM1, PWM2 and PWMn, where n is a positive integer greater than 2. Each power stage receives a PWM signal from the voltage regulator 102 and the input voltage Vin 108. The outputs of the power stages are combined to provide a regulated output voltage Vcc 112 to the processing unit 110.

The processing unit 110 communicates with the voltage regulator 102 through a high speed serial interface (HSSI) 106. The HSSI 106 is also referred as power bus interface or power bus architecture. The specifications for the HSSI are defined by respective manufacturers of processing unit 110. Examples of the industry standard protocols for HSSI include SVID (Serial Voltage Identification), SVI (Serial Voltage Identification Interface) and AVS (Adaptive Voltage Scaling). Those protocols are useful in various systems similar to system 100 based on the compatibility of the processing unit 110.

The processing unit 110 through the HSSI 106 controls the regulated output voltage Vcc 112. Based on an input from the processing unit 110, the voltage regulator 102 generates the desired regulated output voltage Vcc 112. The processing unit 110 dynamically requests the voltage regulator for a new voltage based on its power requirements. In one example, the processing unit 110 programs the voltage regulator 102 to transition to the new voltage at a defined slew rate. In another example, the voltage regulator 102 transitions to the new voltage at the defined slew rate based on its internal requirements. Slew rate is defined as a change in voltage in a time period. Slew rate includes two parameters, voltage step and time step. In one example, slew rate is achieved by incrementing/decrementing the voltage step in a defined number of time steps.

When the voltage regulator 102 transition to a higher voltage, an overshoot is observed when the voltage regulator 102 reaches the new voltage. Similarly, when the voltage regulator 102 transition to a lower voltage, an undershoot is observed when the voltage regulator 102 reaches the new voltage. The voltage transition requests received by the voltage regulator 102 are classified into four categories:

power on request to boot voltage, power off request to zero voltage, request to transition to a higher voltage, request to transition to a lower voltage. Each of these requests have a different slew rate requirement and results in overshoot/undershoot.

The system 100 is applicable to multiple fields, such as server, storage, communication, automotive, personal computer and gaming. Based on an application, the processing unit 110 and the corresponding HSSI 106 used in the system 100 vary. However, the existing voltage regulator 102 does not support custom slew rate from the processing unit 110. Thus, the voltage regulator 102 used in existing systems can only support a single type of processing unit 110 and a single protocol for HSSI 106.

The industry standard protocols for HSSI are updated from time to time. The updates include change in range and resolution of slew rates, change in voltage levels, addition of new commands, and addition of new registers. However, the voltage regulator 102 in existing systems is not adaptable to such updates. Also, the existing voltage regulator 102 does not support customizations made to industry standard protocols for HSSI. One approach includes using multiple voltage regulators, which implement respective industry standard protocols, but that approach greatly increases the system 100 area (which is undesirable). The voltage regulator 102 in existing systems does not support a newly developed processing unit which includes new optimized protocol or new commands. An independent IP (intellectual property) that defines a new multiphase voltage regulator needs to be developed to interact with such a newly developed processing unit. The development of this independent IP is time consuming and intensive process. Also the development may come at the cost of increased area, complexity and power.

Figure 2:
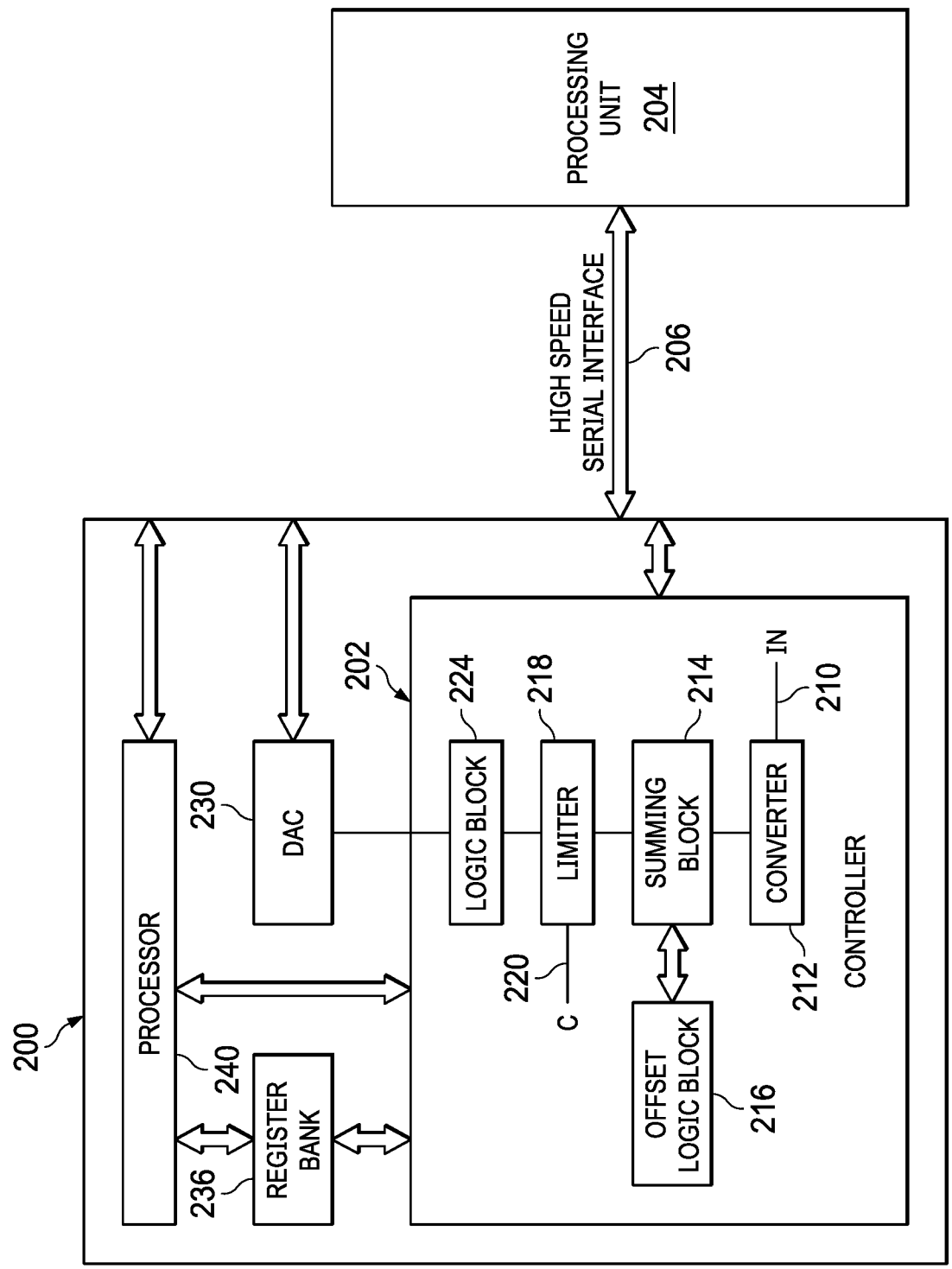
FIG. 2 is a block diagram of a voltage regulator, according to an embodiment.

FIG. 2 is a block diagram of a voltage regulator 200, according to an embodiment. The voltage regulator 200 includes the components of the voltage regulator 102 (FIG. 1), but these components are not shown in FIG. 2 for simplicity. The voltage regulator 200 may include one or more conventional components that are not described herein for simplicity of the description. The voltage regulator 200, similar to voltage regulator 102, communicates with a processing unit 204, which is external to the voltage regulator 200. In one example, the processing unit 204 may be placed on the same PCB (printed circuit board) or board as the voltage regulator 200. The voltage regulator 200 can be a single phase or multiphase voltage regulator. The voltage regulator 200 can also function as a multiphase power controller. In one version, the voltage regulator 200 communicates with a programmable device such as a CPLD (complex programmable logic device) and an FPGA (field programmable gate array).

The voltage regulator 200 communicates with the processing unit 204 through a high speed serial interface (HSSI) 206. The voltage regulator 200 includes a controller 202, a digital to analog converter (DAC) 230, a register bank 236 and a processor 240. The controller 202 includes a converter 212, a summing block 214, an offset logic block 216, a limiter 218 and a logic block 224. All components of the controller 202 are capable of communication with each other and with other components outside of the controller 202. However, all such connections are not shown in FIG. 2 for simplicity.

The summing block 214 is coupled to the converter 212 and the offset logic block 216. The limiter 218 is coupled to the summing block 214. The logic block 224 is coupled to the limiter 218. The DAC 230 is coupled to the logic block 224. The register bank 236 is coupled to the controller 202 and the processor 240. The register bank 236 is coupled to the logic block 224 in the controller 202. The processor 240 is coupled to the controller 202. The processor 240 is capable of communicating with all the blocks of the controller 202. Each block or component of the voltage regulator 200 may also be coupled to other blocks in FIG. 2, but those connections are not described herein for brevity. Also, each block or component of FIG. 2 may be coupled to conventional components of a voltage regulator, which are not shown in FIG. 2 for simplicity.

In operation of the voltage regulator 200, the converter 212 receives an input signal IN 210 and generates a first signal. In one example, the input signal IN 210 is received directly from the processing unit 204 over the HSSI 206. In another example, the input signal IN 210 is provided by another component of the voltage regulator 200. In yet another example, the input signal IN 210 is received directly or indirectly by the controller 202 from a programmable device such as CPLD (complex programmable logic device) and FPGA (field programmable gate array). The input signal IN 210, in one version, includes information of a target signal. In another version, the input signal IN 210 is a self-generated trigger by the voltage regulator 200. In yet another version, the input signal IN 210 is received from a secondary device which may be internal or external of the voltage regulator 200.

The offset logic block 216 stores one or more offset values. The one or more offset values, in one example, include offset values associated with multiple components of the voltage regulator 200. In another example, the one or more offset values include trim values associated with multiple components of the voltage regulator 200. The summing block 214 receives the first signal from the converter 212 and also receives the one or more offset values from the offset logic block 216. The summing block 214 generates a second signal. In one example, the summing block 214 sums the first signal and the one or more offset values to generate the second signal. In one version, the summing block 214 is not present in the controller 202, and the first signal from the converter 212 is provided to the limiter 218.

The limiter 218 receives the second signal and a code signal C 220. The code signal C 220 includes a primary code and a secondary code. In one example, the primary and the secondary code represents the maximum and minimum voltage levels respectively, that can be accommodated by the controller 202. The limiter 218 generates a third signal, and the third signal is maintained between the primary and the secondary code. In one version, the limiter 218 is not present in the controller 202, and the second signal from the summing block 214 is provided to the logic block 224. In another version, the summing block 214 and the limiter 218 are not present in the controller 202, and the first signal from the converter 212 is provided to the logic block 224.

The logic block 224 receives the third signal and generates the target signal. The third signal transition to an intermediate level at a first slew rate, and the third signal transitions from the intermediate level to the target signal at a second slew rate. The intermediate level is between the third signal and the target signal. Slew rate is defined as a change in voltage in a time period. Slew rate includes two parameters, voltage step and time step. In one example, slew rate is achieved by incrementing/decrementing the voltage step in a defined number of time steps. The logic block 224, in one example, is capable of supporting customized voltage step and time step to meet a desired slew rate. In one case, the voltage step is in multiples of 250 microvolt, and time step is in multiples of 20 ns. This enables the voltage regulator to achieve high slew rate using small voltage steps. In another case, the voltage regulator 200 is capable of supporting wide range of slew rates, for example 0.006 mv/us to 800 mv/u, with finer resolution which enables the voltage regulator 200 to be used in multiple application segments. It is understood that the logic block 224 can transition to the target signal using three or more slew rates depending on the requirement of the HSSI protocol and the processing unit 204. The operation of the voltage regulator 200 is explained using the first slew rate and the second slew rate for ease of understanding and simplicity.

The target signal is provided to the DAC 230. The DAC 230 generates a first analog signal which is provided to the processing unit 204. In one example, the first analog signal is provided to an interface component in the voltage regulator 200 before providing it to the processing unit 204 through one or more power stages.

The register bank 236, in one example, stores values of the first slew rate, the second slew rate, the primary code and the secondary code. The processor programs the register bank 236 and the logic block 224 based at least partially on the input signal IN 210. In one version, the processor 240 based on the input signal IN 210 determine values of the first slew rate and the second slew rate. The processor 240 store values of the first slew rate and the second slew rate in the register bank 236. The processor 240 also provides the values of the first slew rate and the second slew rate to the logic block 224. In one version, the logic block 224 is dynamically configured to determine the first slew rate and the second slew rate. In another version, the logic block 224 is programmed by the processor 240 based at least partially on the input signal IN 210.

The first slew rate is proportional to a difference of the intermediate level and the third signal over a first time period. The second slew rate is proportional to a difference of the target signal and the intermediate level over a second time period. In one example, when the target signal is greater than the third signal, the first slew rate is greater than the second slew rate. In another example, when the third signal is greater than the target signal, the second slew rate is greater than the first slew rate. In yet another example, when the third signal is greater than the target signal, an absolute value of the first slew rate is greater than an absolute value of the second slew rate.

In one version, the logic block 224 is dynamically configured to determine the first slew rate and the second slew rate. The voltage regulator 200, in one example, based on its internal transient requirements, may provide the input signal IN 210 which includes information of the target signal. The target signal represents a desired voltage level by the voltage regulator 200. The logic block 224 dynamically determines the first slew rate and the second slew rates based at least partially on the desired voltage level and a current operating voltage of the voltage regulator 200.

The input signal IN 210, in another version, includes information of a new voltage desired by the processing unit 204 based on its power requirements. In one example, the new voltage is desired by the voltage regulator 200 based on its internal settings. The target signal generated by the logic block 224 correlates to the new voltage desired by the processing unit 204. When the new voltage desired by the processing unit 204 is higher than a current voltage provided by the voltage regulator 200 to the processing unit 204, the target signal is higher than the third signal. In this case, the third signal generated by the logic block 224 transition to the target signal using the first slew rate and the second slew rate thus resulting in no overshoot when the third signal reaches a level of the target signal. In one version, the logic block 224 transition to the target signal using a first, a second and a third slew rate, with the first slew rate having slope greater than the second and third slew rate, and the second slew rate having slope greater than the third slew rate. This enables the voltage regulator 200 to mitigate an overshoot when the voltage regulator 200 reaches the target signal provided the target signal is greater than the third signal.

Similarly, when the new voltage desired by the processing unit 204 is lower than the current voltage provided by the voltage regulator 200 to the processing unit 204, the target signal is lower than the third signal. In this case, the third signal generated by the logic block 224 transition to the target signal using the first slew rate and the second slew rate thus resulting in no undershoot when the third signal reaches a level of the target signal. In one version, the logic block 224 transition to the target signal using a first, a second and a third slew rate, with the first slew rate having absolute slope greater than the second and third slew rate, and the second slew rate having absolute slope greater than the third slew rate. This enables the voltage regulator 200 to mitigate an undershoot when the voltage regulator reaches the target signal provided the third signal is greater than the target signal.

The voltage transition requests, in one case, received by the voltage regulator 200 are classified into four categories: power on request to boot voltage, power off request to zero voltage, request to transition to a higher voltage, request to transition to a lower voltage. Each of these requests have a different slew rate requirement. Also, the voltage range and resolution of slew rate is different for different industry standard protocols. The voltage regulator 200 is able to handle all these requests without any overshoot and undershoot irrespective of the industry standard protocol. The logic block 224 uses one or more slew rates to transition to the target signal thus avoiding any overshoot and undershoot. Since the logic block 224 is configurable, the voltage regulator 200 can support any dynamic voltage transition request at a given slew rate. The controller 202 enables smooth transition of the voltage regulator 200 to the target signal.

In some cases, the voltage regulator 200 is required to transition from a current operating level to the target signal at a final slew rate. In order to mitigate the overshoot and undershoot when the voltage regulator 200 reaches the target signal, a ramp between the target signal and the current operating level is divided into one or more zones with configurable thresholds. Each of these zones has a defined slew rate which is configurable based on the final slew rate. In one example, an average of the defined slew rate of each zone is equal to the final slew rate. In another example, a harmonic mean of the defined slew rate of each zone is equal to the final slew rate. In yet another example, the first slew rate and the second slew rate are selected based on the final slew rate.

Thus, the voltage regulator 200 supports any customization made to industry standard protocols. For example, when a manufacturer of the processing unit 204 updates the standard protocol by adding new slew rates or by adding new voltage levels or by changing commands, the voltage regulator 200 is able to support such customization.

The voltage regulator 200 overcomes multiple limitations in existing voltage regulators. The voltage regulator 200 supports one or more industry standard protocols for HSSI. Each industry standard protocol has defined slew rate and defined voltage levels, and the voltage regulator 200 is capable of responding to multiple industry standard protocols such as SVID (Serial Voltage Identification), SVI (Serial Voltage Identification Interface) and AVS (Adaptive Voltage Scaling). Also, the voltage regulator 200 is capable of responding to any version of these standard protocols, such as SVI2 and SVI3.

The voltage regulator 200 is useful in power management systems for various applications, such as server, storage, communication, automotive, personal computer, gaming server, storage, communication, automotive, personal computer and gaming. The voltage regulator 200 is capable of supporting processing units from different manufacturers. Thus, the voltage regulator 200 does not require development of additional hardware to address changes in the slew rates or voltage levels of the processing unit 204. Such development of additional hardware would otherwise consume time and manpower, which are avoided by the dynamic configuration of slew rates in the voltage regulator 200.

Figure 3A:
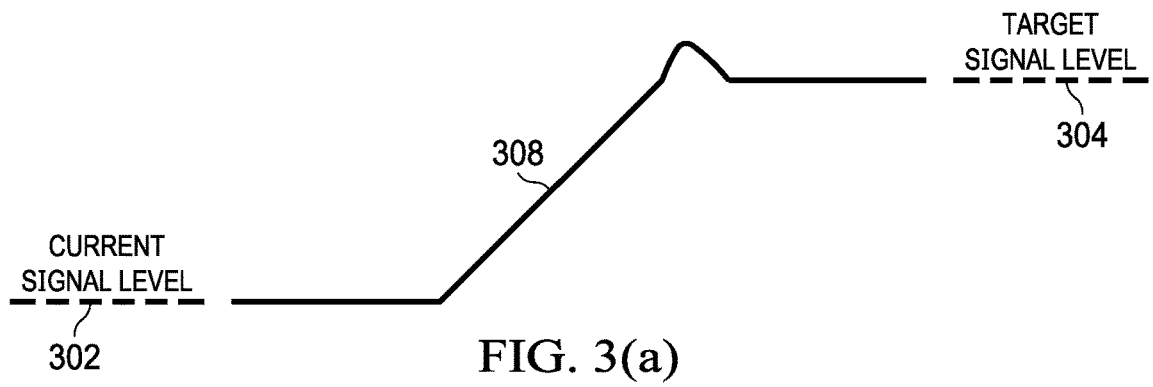
FIG. 3(a) and FIG. 3(b) are waveform diagrams, during an upward transition, in an existing voltage regulator and in a voltage regulator according to an embodiment respectively.
Figure 3B:
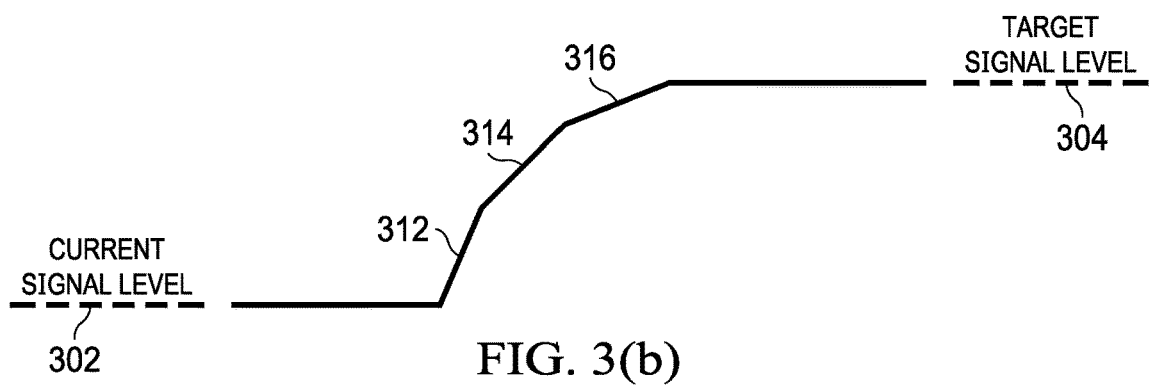

FIG. 3(*a*) and FIG. 3(*b*) are waveform diagrams, during an upward transition, in an existing voltage regulator and in a voltage regulator according to an embodiment respectively. The current signal level 302 represents a current operating level of a voltage regulator, and the voltage regulator transition to a target signal level 304 which represent a desired state of the voltage regulator. FIG. 3(*a*) represents an upward transition in an existing voltage regulator from the current signal level 302 to the target signal level 304. The upward transition occurs at a defined slew rate 308 which results in an overshoot when the voltage regulator reaches the target signal level 304. This result in settling delay in existing voltage regulator. In some cases, the voltage regulator does not settle to the target signal level 304 because of the overshoot.

FIG. 3(*b*) represents an upward transition in a voltage regulator according to an embodiment. The upward transition illustrated in FIG. 3(*b*) is enabled by the voltage regulator 200. The voltage regulator transition from the current signal level 302 to the target signal level 304 using a first slew rate 312, a second slew rate 314 and a third slew rate 316. The voltage regulator, in one example, dynamically select values of the first slew rate 312, the second slew rate 314 and the third slew rate 316. In another example, the voltage regulator based on its internal transient requirement select values of the first slew rate 312, the second slew rate 314 and the third slew rate 316. In yet another example, the voltage regulator based on a command from an internal or external processing unit select values of the first slew rate 312, the second slew rate 314 and the third slew rate 316.

The use of one or more slew rates results in no overshoot when the voltage regulator reaches the target signal level 304. The ability of the voltage regulator to dynamically select one or more slew rates to transition from the current signal level 302 to the target signal level 304 makes it adaptable to different industry standard protocols such as SVID, SVI and AVS. Each industry standard protocol has defined slew rate and defined voltage levels, and in some cases, the specifications of these protocols are updated from time to time. The voltage regulator is able to support any such customization in the standard protocols. The voltage regulator is also capable of interacting with any processor irrespective of its specifications.

Figure 4A:
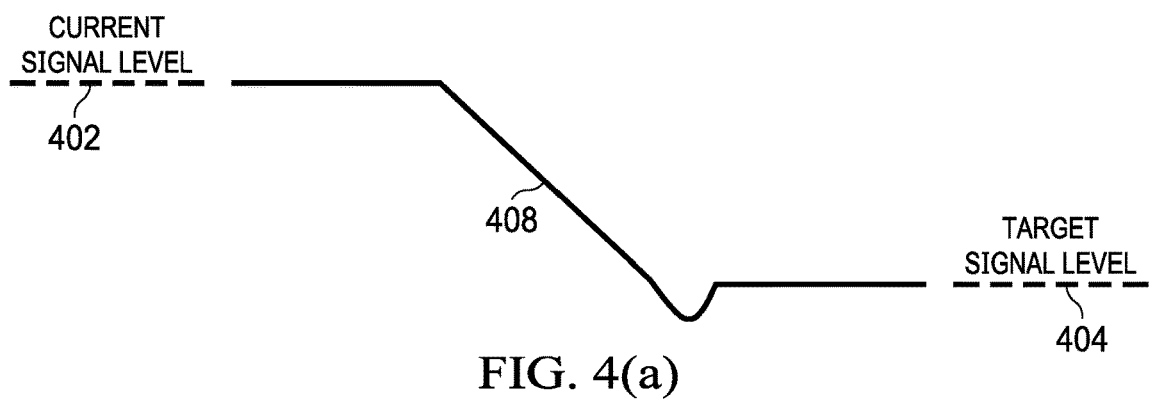
FIG. 4(a) and FIG. 4(b) are waveform diagrams, during a downward transition, in an existing voltage regulator and in a voltage regulator according to an embodiment respectively.
Figure 4B:
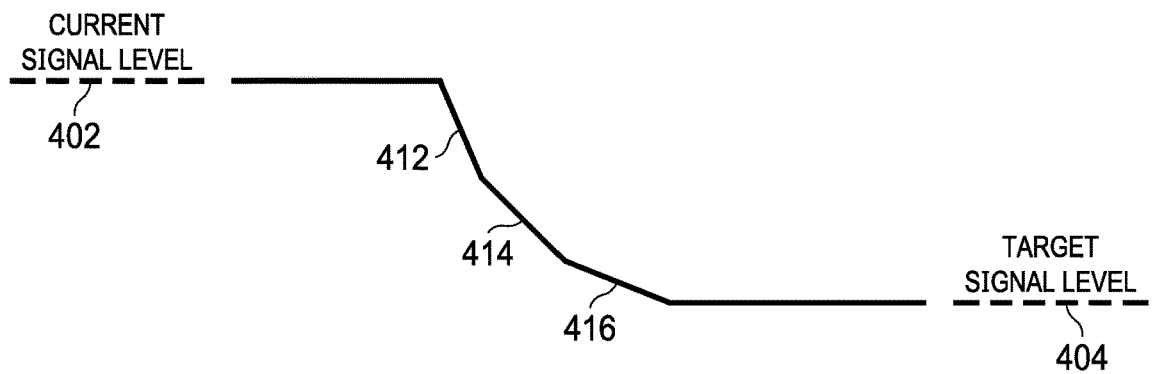

FIG. 4(*a*) and FIG. 4(*b*) are waveform diagrams, during a downward transition, in an existing voltage regulator and in a voltage regulator according to an embodiment respectively. The current signal level 402 represents a current operating level of a voltage regulator, and the voltage regulator transition to a target signal level 404 which represent a desired state of the voltage regulator. FIG. 4(*a*) represents an downward transition in an existing voltage regulator from the current signal level 402 to the target signal level 404. The downward transition occurs at a defined slew rate 408 which results in an undershoot when the voltage regulator reaches the target signal level 404. This result in settling delay in existing voltage regulator. In some cases, the voltage regulator does not settle to the target signal level 404 because of the undershoot.

FIG. 4(*b*) represents an downward transition in a voltage regulator according to an embodiment. The downward transition illustrated in FIG. 4(*b*) is enabled by the voltage regulator 200. The voltage regulator transition from the current signal level 402 to the target signal level 404 using a first slew rate 412, a second slew rate 414 and a third slew rate 416. The voltage regulator, in one example, dynamically select values of the first slew rate 412, the second slew rate 414 and the third slew rate 416. In another example, the voltage regulator based on its internal transient requirement select values of the first slew rate 412, the second slew rate 414 and the third slew rate 416. In yet another example, the voltage regulator based on a command from an internal or external processing unit select values of the first slew rate 412, the second slew rate 414 and the third slew rate 416.

The use of one or more slew rates results in no undershoot when the voltage regulator reaches the target signal level 404. The ability of the voltage regulator to dynamically select one or more slew rates to transition from the current signal level 402 to the target signal level 404 makes it adaptable to different industry standard protocols such as SVID, SVI and AVS. Each industry standard protocol has defined slew rate and defined voltage levels, and in some cases, the specifications of these protocols are updated from time to time. The voltage regulator is able to support any such customization in the standard protocols. The voltage regulator is also capable of interacting with any processor irrespective of its specifications.

Figure 5:
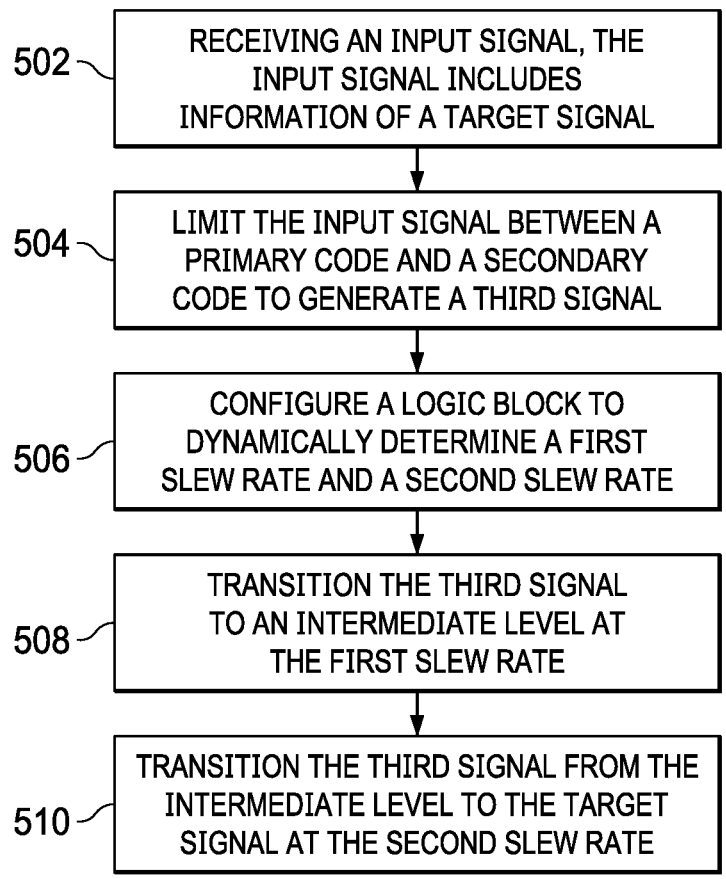
FIG. 5 is a flowchart of a method of operation of a voltage regulator, according to an embodiment.

FIG. 5 is a flowchart 500 of a method of operation of a voltage regulator, according to an embodiment. The flowchart 500 is described in connection with the voltage regulator 200 of FIG. 2. At step 502, an input signal is received. The input signal includes information of a target signal. In the voltage regulator 200, the converter 212 receives an input signal IN 210. The voltage regulator 200, in one example, based on its internal transient requirements, may provide the input signal IN 210 which includes information of a target signal. The target signal represents a desired voltage level by the voltage regulator 200. The input signal IN 210, in another version, includes information of a new voltage desired by the processing unit 204 based on its power requirements. In one example, the new voltage is desired by the voltage regulator 200 based on its internal settings.

At step 504, the input signal is limited between a primary code and a secondary code to generate a third signal. In the voltage regulator 200, for example, the limiter 218 generates a third signal, and the third signal is maintained between the primary and the secondary code. In one example, the primary and the secondary code represents the maximum and minimum voltage levels respectively, that can be accommodated by the controller 202.

At step 506, a logic block is dynamically configured to determine a first slew rate and a second slew rate. The logic block 224, in the voltage regulator 200, is dynamically configured to determine the first slew rate and the second slew rate. The logic block 224 dynamically determines the first slew rate and the second slew rates based at least partially on the desired voltage level and a current operating voltage of the voltage regulator 200. In one version, the processor 240 based on the input signal IN 210 determine values of the first slew rate and the second slew rate. The processor 240 store values of the first slew rate and the second slew rate in the register bank 236. The processor 240 also provides the values of the first slew rate and the second slew rate to the logic block 224.

The third signal transitions to an intermediate level at the first slew rate at step 508, and the third signal transitions from the intermediate level to the target signal at the second slew rate at step 510. The intermediate level is between the third signal and the target signal. Slew rate is defined as a change in voltage in a time period. Slew rate includes two parameters, voltage step and time step. In one example, slew rate is achieved by incrementing/decrementing the voltage step in a defined number of time steps. The first slew rate is proportional to a difference of the intermediate level and the third signal over a first time period. The second slew rate is proportional to a difference of the target signal and the intermediate level over a second time period.

The voltage regulator 200 uses one or more slew rates to transition to the target signal thus avoiding any overshoot and undershoot. Since the logic block 224 is configurable, the voltage regulator 200 can support any dynamic voltage transition request at a given slew rate. The controller 202 enables smooth transition of the voltage regulator 200 to the target signal.

The use of one or more slew rates in a voltage regulator, using the method illustrated by flowchart 500, results in no overshoot or undershoot when the voltage regulator reaches the target signal level. The ability provided by this method enables the voltage regulator to dynamically select one or more slew rates to transition from the current signal level to the target signal level thus making it adaptable to different industry standard protocols such as SVID, SVI and AVS. Each industry standard protocol has defined slew rate and defined voltage levels, and in some cases, the specifications of these protocols are updated from time to time. The method enables the voltage regulator to support any such customization in the standard protocols.

Figure 6:
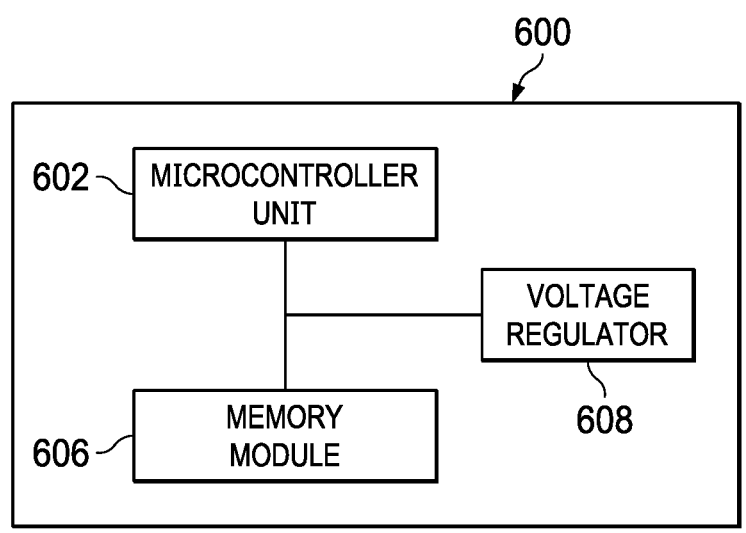
FIG. 6 is a block diagram of an example device in which several aspects of example embodiments can be implemented.

FIG. 6 is a block diagram of an example device 600 in which several aspects of example embodiments can be implemented. The device 600 is, or in incorporated into or is part of, a server farm, a vehicle, a communication device, a transceiver, a personal computer, a gaming platform, a computing device, or any other type of electronic system. The device 600 may include one or more conventional components that are not described herein for simplicity of the description.

In one example, the device 600 includes a microcontroller unit 602 and a memory module 606. The microcontroller unit 602 can be a CISC-type (complex instruction set computer) CPU, RISC-type CPU (reduced instruction set computer), a digital signal processor (DSP), a processor, a CPLD (complex programmable logic device) or an FPGA (field programmable gate array).

The memory module 606 (which can be memory such as RAM, flash memory, or disk storage) stores one or more software applications (e.g., embedded applications) that, when executed by the microcontroller unit 602, performs any suitable function associated with the device 600.

The microcontroller unit 602 usually includes memory and logic, which store information frequently accessed from the memory module 606. The device 600 includes a voltage regulator 608. In one example, the microcontroller unit 602 may be placed on the same PCB or board as the voltage regulator 608. In another example, the microcontroller unit 602 is external to the device 600. The voltage regulator 608 can be a single phase or multiphase voltage regulator. The voltage regulator 608 can also function as a multiphase power controller.

The voltage regulator 608 is similar, in connection and operation, to the voltage regulator 200 of FIG. 2. The voltage regulator 608 includes a controller, a register bank and a processor. The controller includes a converter, a summing block, an offset logic block, a limiter and a logic block. In the voltage regulator 608, the converter receives an input signal. The voltage regulator 608, in one example, based on its internal transient requirements, may provide the input signal which includes information of a target signal. The target signal represents a desired voltage level by the voltage regulator 608. In one example, the target signal is desired by the voltage regulator 608 based on its internal settings.

The input signal is limited between a primary code and a secondary code to generate a third signal. In one example, the primary and the secondary code represents the maximum and minimum voltage levels respectively, that can be accommodated by the controller. The logic block is dynamically configured to determine a first slew rate and a second slew rate. The logic block dynamically determines the first slew rate and the second slew rate based at least partially on the desired voltage level and a current operating voltage of the voltage regulator 608.

The third signal transitions to an intermediate level at a first slew rate, and the third signal transitions from the intermediate level to the target signal at the second slew rate. The intermediate level is between the third signal and the target signal. Slew rate is defined as a change in voltage in a time period. Slew rate includes two parameters, voltage step and time step. In one example, slew rate is achieved by incrementing/decrementing the voltage step in a defined number of time steps. The first slew rate is proportional to a difference of the intermediate level and the third signal over a first time period. The second slew rate is proportional to a difference of the target signal and the intermediate level over a second time period.

The voltage regulator 608 uses one or more slew rates to transition to the target signal thus avoiding any overshoot and undershoot. Since the logic block in the voltage regulator 608 is configurable, the voltage regulator 608 can support any dynamic voltage transition request at a given slew rate. The controller enables smooth transition of the voltage regulator 608 to the target signal.

The use of one or more slew rates results in no overshoot or undershoot when the voltage regulator 608 reaches the target signal. The ability of the voltage regulator 608 to dynamically select one or more slew rates to transition from the current signal level to the target signal makes it adaptable to different industry standard protocols such as SVID, SVI and AVS. Each industry standard protocol has defined slew rate and defined voltage levels, and in some cases, the specifications of these protocols are updated from time to time. The voltage regulator 608 is able to support any such customization in the standard protocols. The voltage regulator 608 is also capable of interacting with any processor irrespective of its specifications.

Modifications are possible in the described embodiments, and other embodiments are possible, within the scope of the claims.

What is claimed is:

1. A circuit comprising:
a controller, the controller including:
   a converter configured to generate a first signal responsive to an input signal;
   a summing block coupled to the converter, the summing block configured to receive the first signal and to generate a second signal;
   a limiter coupled to the summing block and configured to generate a third signal responsive to the second signal and a code signal; and
   a logic block configured to generate a target signal responsive to the third signal, wherein the target signal transitions from a current signal level to an intermediate level at a first slew rate in a first time period and then the target signal transitions from the intermediate level to a target signal level at a second slew rate in a second time period; and
a processor coupled to the controller, the processor configured to, responsive to the input signal, determine the first slew rate and the second slew rate, and provide the first slew rate and the second slew rate to the logic block.

2. The circuit of claim 1 further comprising an offset logic block coupled to the summing block, the offset logic block configured to store one or more offset values.

3. The circuit of claim 2, wherein the summing block is configured to generate the second signal from the first signal and the one or more offset values.

4. The circuit of claim 2, wherein the code signal includes a primary code and a secondary code, and the third signal generated by the limiter is maintained between the primary code and the secondary code.

5. The controller of claim 4, wherein the logic block is coupled to a register bank, the register bank configured to store values of the first slew rate, the second slew rate, the primary code and the secondary code.

6. The controller of claim 5, wherein the register bank and the logic block are coupled to the processor, the processor configured to program the register bank and the logic block based at least partially on the input signal.

7. The controller of claim 6, wherein the processor is configured to store the values of the first slew rate and the second slew rate in the register bank.

8. The circuit of claim 1, wherein the first slew rate is proportional to a difference of the intermediate level and the current signal level over the first time period.

9. The circuit of claim 1, wherein the second slew rate is proportional to a difference of the target signal level and the intermediate level over the second time period.

10. The circuit of claim 1, wherein when the target signal level is greater than the current signal level, the first slew rate is greater than the second slew rate.

11. The circuit of claim 1, wherein when the current signal level is greater than the target signal level, the second slew rate is greater than the first slew rate.

12. The circuit of claim 1, wherein the intermediate level is between the current signal level and the target signal level.

13. A system comprising:
a microcontroller unit; and
a voltage regulator coupled to the microcontroller unit, the voltage regulator including a controller and a processor coupled to the controller, the controller further comprising:
   a converter configured to generate a first signal responsive to an input signal;
   a summing block coupled to the converter and configured to generate a second signal responsive to the first signal;
   a limiter coupled to the converter and configured to generate a third signal responsive to the second signal and a code signal; and
   a logic block configured to generate a target signal responsive to the third signal, wherein the target signal transitions from a current signal level to an intermediate level at a first slew rate and then the target signal transitions from the intermediate level to a target signal level at a second slew rate, wherein the processor configured to, responsive to the input signal, determine values of the first slew rate and the second slew rate, and provide the first slew rate and the second slew rate to the logic block.

14. The system of claim 13, wherein the processor configured to
store the values of the first slew rate and the second slew rate in a register bank.

15. The system of claim 13, wherein the first slew rate is proportional to a difference of the intermediate level and the current signal level over a first time period, and the second slew rate is proportional to a difference of the target signal level and the intermediate level over a second time period.

16. A method comprising:
receiving an input signal, the input signal includes information of a target signal level;
limiting the input signal between a primary code and a secondary code to generate a third signal;
determining values of a first slew rate and a second slew rate by a processor responsive to the input signal;
storing values of the first slew rate, the second slew rate, the primary code and the secondary code in a register bank;
configuring the processor to provide the first slew rate and the second slew rate to a logic block; and
configuring the logic block to generate a target signal from the third signal, the third signal transitions from a current signal level to an intermediate level at the first slew rate in a first time period and then transitions from the intermediate level to a target signal level at the second slew rate in a second time period.

17. The method of claim 16 further comprising summing the input signal and one or more offset values.

18. The method of claim 16, wherein configuring the logic block further comprises programming the logic block by the processor based at least partially on the input signal.

19. The method of claim 16, wherein the input signal includes information of a final slew rate, and the first slew rate and the second slew rate are selected based on the final slew rate.

* * * * *